US012606138B2

(12) United States Patent
Liu

(10) Patent No.: US 12,606,138 B2
(45) Date of Patent: Apr. 21, 2026

(54) SAFE DRIVING EARLY WARNING SYSTEM BASED ON DRIVER EMOTION INTERVENTION

(71) Applicant: THE THIRD RESEARCH INSTITUTE OF MINISTRY OF PUBLIC SECURITY, Shanghai (CN)

(72) Inventor: Caixia Liu, Shanghai (CN)

(73) Assignee: THE THIRD RESEARCH INSTITUTE OF MINISTRY OF PUBLIC SECURITY (CN)

( * ) Notice: Subject to any disclaimer, the term of this patent is extended or adjusted under 35 U.S.C. 154(b) by 43 days.

(21) Appl. No.: 18/710,866

(22) PCT Filed: Nov. 4, 2022

(86) PCT No.: PCT/CN2022/129873
§ 371 (c)(1),
(2) Date: May 16, 2024

(87) PCT Pub. No.: WO2023/236434
PCT Pub. Date: Dec. 14, 2023

(65) Prior Publication Data
US 2025/0033615 A1 Jan. 30, 2025

(30) Foreign Application Priority Data
Jun. 7, 2022 (CN) .......................... 202210642173.8

(51) Int. Cl.
*B60T 8/58* (2006.01)
*B60Q 9/00* (2006.01)
(Continued)

(52) U.S. Cl.
CPC .................. *B60T 8/58* (2013.01); *B60Q 9/00* (2013.01); *B60T 7/12* (2013.01); *B60T 8/171* (2013.01);
(Continued)

(58) Field of Classification Search
CPC . B60T 8/58; B60T 8/171; B60T 8/172; B60T 7/12; B60T 2201/03;
(Continued)

(56) References Cited

U.S. PATENT DOCUMENTS

2013/0054090 A1 2/2013 Shin et al.
2024/0343254 A1* 10/2024 Liu ...................... G06V 40/174

FOREIGN PATENT DOCUMENTS

CN 109572705 4/2019
CN 110154757 8/2019
(Continued)

OTHER PUBLICATIONS

Liu, Caixia; International Search Report and Written Opinion for PCT/CN2022/129873, filed Nov. 4, 2022, mailed Dec. 14, 2022, 13 pages.

*Primary Examiner* — Hai H Huynh
(74) *Attorney, Agent, or Firm* — Taylor Duma LLP

(57) ABSTRACT

The present invention discloses a safe driving early warning system for intervention based on driver emotions. The system obtains current driver facial expression dynamics through a driver emotion real-time recognition unit, performs intelligent emotional analysis based on the obtained facial expression dynamics, and controls a vehicle running status based on a real-time emotion recognition result. The system monitors driver emotions in real time during driving, and controls a vehicle driving status and/or issues a safety warning to a driver according to a monitoring result, so as to ensure the traffic safety of various vehicles from the perspective of the driver.

10 Claims, 3 Drawing Sheets

(51) Int. Cl.

| | |
|---|---|
| *B60T 7/12* | (2006.01) |
| *B60T 8/171* | (2006.01) |
| *B60T 8/172* | (2006.01) |
| *G06V 20/59* | (2022.01) |
| *G06V 40/16* | (2022.01) |

(52) U.S. Cl.
CPC ............ *B60T 8/172* (2013.01); *G06V 20/597* (2022.01); *G06V 40/176* (2022.01); *B60T 2201/03* (2013.01); *B60T 2220/02* (2013.01); *B60T 2250/04* (2013.01); *B60T 2270/10* (2013.01)

(58) Field of Classification Search
CPC ............. B60T 2220/02; B60T 2250/04; B60T 2270/10; B60Q 9/00; G06V 20/597; G06V 40/176; B60W 40/08; B60W 2050/143; B60W 50/14; B60K 28/06; B60R 16/023; G08B 25/10
USPC ................................... 701/70, 44, 43, 42, 41
See application file for complete search history.

(56) References Cited

FOREIGN PATENT DOCUMENTS

| | | | | | |
|---|---|---|---|---|---|
| CN | 112606820 A | * | 4/2021 | ........ | B60W 60/0015 |
| CN | 114049677 | | 2/2022 | | |
| CN | 114802266 | | 7/2022 | | |
| CN | 115056786 | | 9/2022 | | |

* cited by examiner

SAFE DRIVING EARLY WARNING SYSTEM BASED ON DRIVER EMOTION INTERVENTION

CROSS-REFERENCE TO RELATED APPLICATIONS

The present application is a National Stage application of PCT international application: PCT/CN2022/129873, filed on 4 Nov. 2022, the disclosure of which is hereby incorporated by reference in its entirety.

TECHNICAL FIELD

The present invention relates to automobile driving safety monitoring technologies, and specifically, to driving safety monitoring of all commercial vehicles such as road passenger transport, tourist passenger transport, hazardous chemical transport vehicles, freight vehicles, school buses, buses, taxis, online car-hailing or rental cars on various platforms, non-commercial transport vehicles, and private vehicles.

BACKGROUND

With the rapid development of social economy, the total road mileage in our country has increased rapidly, and the number of vehicles driving on the roads has also increased. With the development of transportation and the increase of vehicles, the number of road traffic accidents in my country is also rising. In recent years, nearly 100,000 people die in traffic accidents every year on average in my country, nearly 300 people are killed by traffic accidents every day, and the traffic accident fatality rate accounts for about 15% of the global total, making it a country prone to traffic accidents. In the past three years, an average of 240,000 traffic accidents occurred nationwide with an average annual death toll of about 60,000, causing direct property losses of 1.4 billion yuan each year.

Among the three elements of people, vehicles, and road environment that cause traffic accidents, the factor of people accounts for more than 55%, and traffic accidents caused by abnormal driver emotions or even driving a car in anger account for nearly 30%.

Studies have shown that the emotions of car drivers have a great influence on safe driving. When the driver is satisfied, happy, pleased, and joyful, the reaction sensitivity is improved, the driver is full of energy and concentrated, and can observe and analyze the situation sensitively, the operation is fast, agile, and timely, and the driving errors are fewer, which guarantees driving safety. Conversely, when the driver has negative emotions such as disgust, anger, fear, or sorrow, the ability to feel is reduced, the energy is scattered, and the driver is listless, unresponsive, slow in operation, and sometimes makes mistakes, which is a potential threat to driving safety. In severe cases, accidents may be caused subjectively under the impulse of "road rage" caused by bad emotions.

Therefore, how to effectively monitor and actively intervene in potential accident risks caused by abnormal emotions of drivers through effective technical means, and effectively improve the driving safety of all driving vehicles of commercial vehicles, non-commercial transport vehicles, and private vehicles, and especially in the event of an accident, how to ensure the driving safety of the "road passenger transport vehicles, tourist passenger transport vehicles, and hazardous chemical transport vehicles", freight vehicles, and school buses with more serious consequences is an urgent problem to be solved in this field.

SUMMARY

In view of the problem that the existing technical means cannot implement the safety management and control of the vehicle according to the emotional instability of the driver, a solution that can effectively monitor an emotional status of a driver of a vehicle, emotionally intervene the driver based on a monitoring result, and perform safety management and control of the driving status of the vehicle is needed.

For this reason, the purpose of the present invention is to provide a safe driving early warning system for intervention based on driver emotions, which uses a driver emotion analysis technology to monitor the driver emotional status in real time, implements linkage with the vehicle control system, and effectively warns and actively intervenes in potential accident risks that may be caused by a driver emotion abnormality. This avoids that the driver drives the vehicle in an abnormal emotional status that hinders safe driving, ensures that the driver drives the vehicle safely in a normal emotional status, and ensures that the vehicle performs active intelligent safety prevention and control when the driver has abnormal emotions, so as to improve vehicle running safety.

In order to achieve the above object, a safe driving early warning system for intervention based on driver emotions provided by the present invention includes:

a driver emotion real-time recognition unit, configured to obtain current driver facial expression dynamics, and perform intelligent emotional analysis based on the obtained facial expression dynamics or transmit the obtained facial expression dynamics to a vehicle-mounted gateway unit for intelligent emotional analysis; wherein the driver emotion real-time recognition unit can be directly associated with a vehicle control unit according to a real-time emotion recognition result or can be associated with the vehicle control unit through the vehicle-mounted gateway unit, to control a vehicle running status;

the vehicle-mounted gateway unit, respectively associated with the driver emotion real-time recognition unit, the vehicle control unit, a warning prompt unit, and a remote management unit; wherein the vehicle-mounted gateway unit can also cooperate with the driver emotion real-time recognition unit to perform emotion recognition;

the vehicle control unit, linked to a start system, a speed control system, and a braking system of the vehicle and associated with the vehicle-mounted gateway unit and the driver emotion real-time recognition unit, wherein the vehicle control unit controls the vehicle driving status according to a driver real-time emotional status analysis result sent by the driver emotion real-time recognition unit or the vehicle-mounted gateway unit;

the warning prompt unit, respectively connected and cooperating with the driver emotion real-time recognition unit and the vehicle-mounted gateway unit; and the remote management unit, wherein the remote management unit cooperates with the driver emotion real-time recognition unit to complete driver emotion recognition through the vehicle control unit, and can give corresponding vehicle management and driver management control instructions and feed back the instructions to the vehicle-mounted gateway unit.

Further, the driver emotion real-time recognition unit includes a facial high-speed camera module and an emotion intelligent analysis and recognition module;

the facial high-speed camera module is configured to capture the current driver facial expression dynamics; and may include a facial high-speed camera capturing apparatus and a supplementary light apparatus; and the emotion intelligent analysis and recognition module is configured to perform intelligent analysis and recognition on the facial expression dynamics captured by the facial high-speed camera module, and determine a current driver real-time emotional status.

Further, the driver emotion real-time recognition unit is directly associated with the vehicle control unit or indirectly associated with the vehicle control unit and/or the remote management unit through a vehicle-mounted gateway.

Further, the vehicle-mounted gateway unit includes a network communication module and/or a data storage module and/or an edge computing module;

the network communication module is configured to perform data exchange between the driver emotion real-time recognition unit, the warning prompt unit, the vehicle control unit, and the remote management unit;

the data storage module is configured to store data exchanged between the driver emotion real-time recognition unit, the warning prompt unit, the vehicle control unit, and the remote management unit; and the edge computing module is configured to perform emotion intelligent analysis and recognition based on the data exchanged between the driver emotion real-time recognition unit, the warning prompt unit, the vehicle control unit, and the remote management unit.

Further, the network communication module of the vehicle-mounted gateway unit includes a 5G communication apparatus, a CAN bus communication apparatus, a TCP/IP communication apparatus, a Bluetooth (Bluetooth) communication apparatus, and other wireless communication (Wi-Fi, UWB, Zigbee, and the like) apparatuses.

Further, the data storage module of the vehicle-mounted gateway unit includes a built-in data storage apparatus and an external data storage apparatus.

Further, the edge computing module of the vehicle-mounted gateway unit includes an AI intelligent chip with an edge computing function and a terminal SDK with edge computing.

Further, the vehicle-mounted gateway unit is directly associated with the driver emotion real-time recognition unit, the vehicle control unit, the warning prompt unit, and the remote management unit.

Further, the warning prompt unit includes a vehicle local warning prompt subunit and a remote monitoring client software warning prompt subunit.

Further, the warning prompt unit is directly associated with the driver emotion real-time recognition unit and the vehicle-mounted gateway unit.

Further, the vehicle control unit includes an anti-lock brake module and/or a speed limit management module and/or an intelligent brake management module and/or an electronic brake assist module;

the anti-lock brake module is configured to avoid, when an abnormal driver status monitoring result is received, losing control over a vehicle driving direction or skidding that may occur during emergency braking;

the speed limit management module is configured to control a vehicle maximum driving speed when receiving the abnormal driver status monitoring result;

the intelligent brake management module is configured to start the intelligent brake apparatus to reduce a vehicle real-time driving speed when receiving the abnormal driver status monitoring result; and the electronic brake assist module is configured to rapidly start a full braking force if emergency braking is required when the abnormal driver status monitoring result is received.

Further, the vehicle control unit is directly associated with the driver emotion real-time recognition unit and the vehicle-mounted gateway unit. When the vehicle control unit receives an abnormal driver real-time emotion recognition result, the vehicle control unit controls vehicle speed limitation, speed reduction, or emergency braking.

Further, the safe driving early warning system further includes the remote management unit, wherein the remote management unit cooperates with the driver emotion real-time recognition unit to complete driver emotion recognition through the vehicle control unit, and can give corresponding vehicle management and driver management control instructions and feed back the instructions to the vehicle-mounted gateway unit.

Further, the remote management unit includes a government industry management client software, an enterprise operation management client software, a driver and passenger service client software, and a communication center.

Further, the government industry management client of the remote management unit includes public security industry management client software, transportation industry management client software, emergency industry management client software, and other industry management client software (for example, insurance industry management client software) according to different industry departments.

Further, the enterprise operation management client of the remote management unit includes consignor management client software, carrier management client software, and consignee management client software according to different users.

Further, the driver and passenger service management client of the remote management unit includes driver service client software and escort (safety personnel) service client software according to different users.

Further, the communication center of the remote management unit includes a cloud platform, a local server, and a personal mobile intelligent terminal.

Further, the remote management unit receives the driver real-time emotion recognition result sent by the vehicle-mounted gateway unit and gives vehicle management and driver management control instructions, or receives driver facial expression dynamic capturing information sent by the vehicle-mounted gateway unit, recognizes driver real-time emotions, gives vehicle management and driver management control instructions based on an emotion recognition result, feeds back the instructions to the vehicle-mounted gateway unit, and feeds back the instructions to the warning prompt unit or the vehicle control unit through the vehicle-mounted gateway unit.

The safe driving early warning system for intervention based on driver emotions provided by the present invention can monitor and warn the driver emotional status in real time during driving, and automatically control the vehicle driving status in a linkage manner through active driving assisted by safety prevention and control according to the monitoring result and give a safety warning to the driver, so as to ensure the safe operation of automobile transportation from the perspective of the driver.

Specifically, the safe driving early warning system for intervention based on driver emotions provided by the present invention can monitor the driver facial dynamic expression or facial vibration amplitude in real time during vehicle driving, comprehensively analyze the driver real-time emotional status, automatically control the vehicle to perform automatic speed limitation, speed reduction, or emergency brake according to the emotional status analysis and recognition result, and issue voice prompts or sound and light warnings to effectively warn and actively intervene in potential accident risks that may be caused by driver factors. This avoids that the driver drives the vehicle in an abnormal emotional status that hinders safe driving, ensures that the driver drives the vehicle safely in a normal emotional and mental status, and ensures that the vehicle performs active intelligent safety prevention and control when the driver has abnormal emotions, so as to improve vehicle running safety.

BRIEF DESCRIPTION OF THE DRAWINGS

The present invention will be further described below in conjunction with the accompanying drawings and specific embodiments.

DETAILED DESCRIPTION

In order to make the technical means, creative features, goals and effects achieved by the present invention easy to understand, the present invention will be further described below in conjunction with specific diagrams.

In the present invention, the driver real-time emotional status is monitored in real time during driving in an innovative manner from the perspective of driver management, the vehicle driving status is controlled in real time in a linkage manner according to the monitoring result and/or a safety warning is given to the driver, so as to give intelligent early warning of potential safety hazards that may be caused by driver factors, and the vehicle driving status can be controlled in a linkage manner, so as to eliminate potential safety hazards caused by driver factors and ensure the transportation safety of corresponding vehicles from the perspective of driver management.

In this way, the safe driving early warning system for intervention based on driver emotions provided by the present invention can monitor the driver facial dynamic expression or facial vibration amplitude in real time during vehicle driving, comprehensively analyze the driver real-time emotional status, automatically control the vehicle to perform automatic speed limitation, speed reduction, or emergency brake according to the emotional status analysis and recognition result, and issue voice prompts or sound and light warnings to effectively warn and actively intervene in potential accident risks that may be caused by driver emotional abnormality factors. This avoids that the driver drives the vehicle in an abnormal emotional status that hinders safe driving, ensures that the driver drives the vehicle safely in a normal emotional and mental status, and ensures that the vehicle performs active intelligent safety prevention and control when the driver has abnormal emotions, so as to avoid transportation safety accidents of corresponding vehicles such as all commercial vehicles such as road passenger transport, tourist passenger transport, hazardous chemical transport vehicles, freight vehicles, school buses, buses, taxis, online car-hailing or rental cars on various platforms, non-commercial transport vehicles, and private vehicles.

Figure 1:
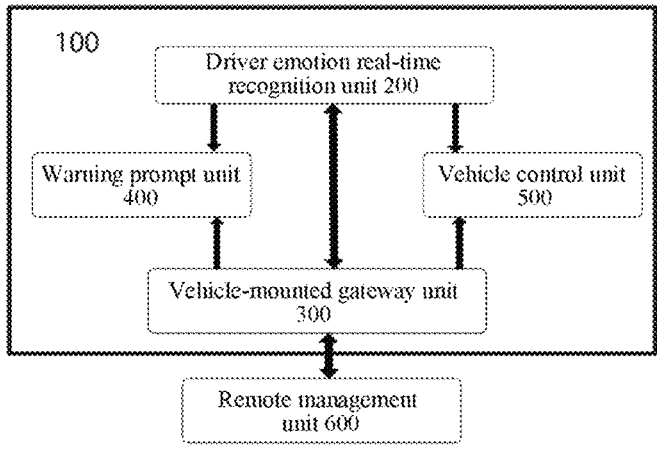
FIG. 1 is a schematic diagram of a composition principle and a usage procedure of a safe driving early warning system for intervention based on driver emotions according to an embodiment of the present invention.

FIG. 1 is a schematic diagram of an overall composition principle of a safe driving early warning system for intervention based on driver emotions according to the present invention.

As shown in FIG. 1, the safe driving management system mainly includes a driver emotion real-time recognition unit 200, a vehicle-mounted gateway unit 300, a warning prompt unit 400, a vehicle control unit 500, and a remote management unit 600 that cooperate with each other.

The driver emotion real-time recognition unit 200 in this system is arranged in a cab of a vehicle 100 to be monitored, is associated with the vehicle-mounted gateway unit 300, the warning prompt unit 400, and the vehicle control unit 500 of the vehicle, and is associated with the remote management unit 600 through the vehicle-mounted gateway unit 300.

The driver emotion real-time recognition unit 200 can monitor the driver emotional status in real time, which can be transmitted to the remote management unit 600 through the driver emotion real-time recognition unit, an edge computing module of the vehicle-mounted gateway unit 300 or a network communication module of the vehicle-mounted gateway unit 300 for emotion recognition and judgment.

At the same time, the driver emotion real-time recognition unit 200 can obtain, according to the real-time emotion recognition result, management instructions generated based on a related emotion recognition result or obtain the instructions from the remote management unit through the vehicle-mounted gateway unit, is directly associated with the vehicle control unit 500 or is associated with the vehicle control unit 500 through the vehicle-mounted gateway unit 300, and controls the working status of the vehicle anti-lock brake system (ABS) module, a speed limit management module, an intelligent brake management module, or an electronic brake assist (EBA) module to perform a speed limitation, speed control, or speed reduction operation.

As an example, the vehicle 100 to be monitored herein can be all commercial vehicles such as road passenger transport vehicles, tourist passenger transport vehicles, hazardous chemical transport vehicles, freight vehicles, school buses, taxis, online car-hailing vehicles and rental cars on various platforms and non-commercial transport vehicles. The vehicle can also be a general private vehicle as required.

The driver emotion real-time recognition unit 200 in this embodiment can effectively obtain the current driver facial expression dynamics, and transmit the obtained facial expression dynamics to an intelligent emotion analysis function module of the driver emotion real-time recognition unit (for example, an edge computing module built in the driver emotion real-time recognition unit 200) or an intelligent emotion analysis function module of the vehicle-mounted gateway unit (for example, an edge computing module built in the vehicle-mounted gateway unit) or an intelligent emotion analysis function module of the remote management unit through the vehicle-mounted gateway unit.

As an example, the driver emotion real-time recognition unit 200 can be specifically provided with a corresponding intelligent emotion analysis function module according to needs, and the intelligent emotion analysis function module is configured to receive the current driver facial expression dynamic data obtained by the driver emotion real-time recognition unit 210. The dynamic data herein can be videos, pictures, etc., intelligent emotion analysis is performed based on the data, and a corresponding real-time emotion analysis result is formed.

Further, the intelligent emotion analysis function module can be implemented by the edge computing module built in the driver emotion real-time recognition unit 200. A specific composition technology can be determined according to actual needs, for example, can be implemented based on an edge computing function of the hardware of the driver emotion real-time recognition unit 200.

The driver emotion real-time recognition unit 200 provided in this way can capture the current driver facial expression dynamics and/or perform intelligent analysis and recognition on the captured facial expression dynamics to determine the current driver real-time emotional status.

When the driver emotion real-time recognition unit 200 performs intelligent analysis and recognition, this can be directly implemented by building a corresponding edge computing module (for example, an intelligent emotion analysis function module) in the driver emotion real-time recognition unit 200.

As an alternative solution, the driver emotion real-time recognition unit 200 can also cooperate with the vehicle-mounted gateway unit 300 to complete the driver emotion intelligent analysis and recognition. In this alternative solution, by running the corresponding edge computing module in the vehicle-mounted gateway unit 300, the driver emotion real-time recognition unit 200 transmits the obtained current driver facial expression dynamic data to the vehicle-mounted gateway unit 300, and the edge computing module running in the vehicle-mounted gateway unit 300 performs intelligent analysis and recognition based on the data, and determines the current driver real-time emotional status.

As another alternative solution, the driver emotion real-time recognition unit 200 can also cooperate with the vehicle-mounted gateway unit 300 and the remote management unit 600 to complete the driver emotion intelligent analysis and recognition. In this alternative solution, the driver emotion real-time recognition unit 200 transmits the obtained current driver facial expression dynamic data to the vehicle-mounted gateway unit 300, the vehicle-mounted gateway unit 300 transmits the obtained current driver facial expression dynamic data to the remote management unit 600, and the remote management unit 600 performs intelligent analysis and recognition based on the data, and determines the current driver real-time emotional status.

In this way, when the driver emotion real-time recognition unit 200 runs, the edge computing module of the driver emotion real-time recognition unit 200, or the edge computing module of the vehicle-mounted gateway unit 300, or the network communication module of the vehicle-mounted gateway unit 300 transmits the monitored data to the remote management unit 600 for emotion recognition and determination.

At the same time, the driver emotion real-time recognition unit 200 can obtain, according to the real-time emotion recognition result, management instructions generated based on a related emotion recognition result or obtain the instructions from the remote management unit 600 through the vehicle-mounted gateway unit 300, is directly associated with the vehicle control unit 500 or is associated with the vehicle control unit 500 through the vehicle-mounted gateway unit 300, and controls the working status of the vehicle anti-lock brake system (ABS) module, a speed limit management module, an intelligent brake management module, or an electronic brake assist (EBA) module to perform a speed limitation, speed reduction, or emergent brake operation to control the vehicle running status.

As shown in FIG. 1, the vehicle-mounted gateway unit 300 in this system is arranged in the cab of the vehicle 100 to be monitored, and is associated with the driver emotion real-time recognition unit 200, the warning prompt unit 400, the vehicle control unit 500, and the remote management unit 600 of the vehicle.

The vehicle-mounted gateway unit 300 herein has at least a network communication function and/or a data storage function and/or an edge computing function and establishes a communication channel with the remote management unit 600 to recognize and analyze data information generated by the driver emotion real-time recognition unit 200, or transmit relevant information to the remote management unit for recognition and analysis, and send, to the vehicle control unit and the warning prompt unit, management data information returned by the remote management unit.

Figure 3:
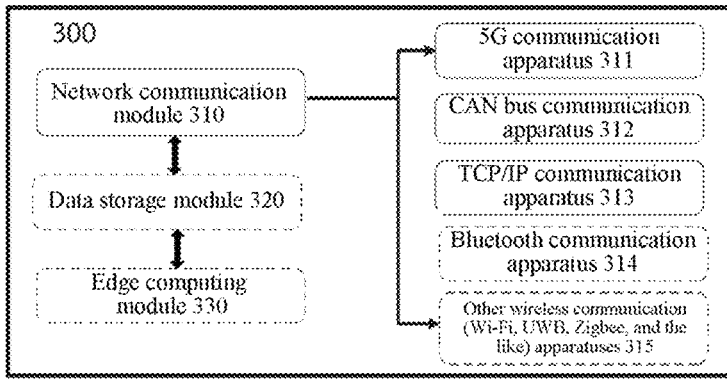
FIG. 3 is a schematic diagram of a composition principle of a vehicle-mounted gateway unit and a network communication module thereof according to an embodiment of the present invention.

FIG. 3 is a schematic diagram of a composition principle of the vehicle-mounted gateway unit 300 and a network communication module thereof in a safe driving early warning system for intervention based on driver emotions according to this embodiment.

Based on FIG. 3, the vehicle-mounted gateway unit 300 in this embodiment includes a network communication module 310 and/or a data storage module 320 and/or an edge computing module 330 in combination or independently. The network communication module 310 is a basic component, that is, a necessary component of the vehicle-mounted gateway unit 300.

As shown in FIG. 1 and FIG. 3, the vehicle-mounted gateway unit 300 provided in this way performs data exchange between the driver emotion real-time recognition unit 200, the warning prompt unit 400, the vehicle control unit 500, and the remote management unit 600 through the network communication module 310.

The vehicle-mounted gateway unit 300 can use the network communication module 310 to forward, to the remote management unit 600, the current driver facial expression dynamic information or real-time emotion analysis and recognition result uploaded by the driver emotion real-time recognition unit 200.

Correspondingly, the vehicle-mounted gateway unit 300 can also send corresponding instructions to the vehicle control unit 500 and the warning prompt unit 400 according to the received driver real-time emotion analysis and recognition result; send corresponding instructions to the vehicle control unit 500 and the warning prompt unit 400 based on the real-time emotion analysis and recognition result obtained by the edge computing module 330 of the vehicle-mounted gateway unit 300; or forward received management instructions of the remote management unit 600 to the driver emotion real-time recognition unit 200 or the warning prompt unit 400 or the vehicle control unit 500.

The vehicle-mounted gateway unit 300 can use the data storage module 320 to store the current driver facial expression dynamic information uploaded by the driver emotion real-time recognition unit 200.

The vehicle-mounted gateway unit 300 can use the edge computing module 330 to perform intelligent emotional analysis, recognition, and determination on the current driver facial expression dynamic information uploaded by the driver emotion real-time recognition unit 200.

As shown in FIG. 1, the warning prompt unit 400 in this system is arranged in the cab of the vehicle 100 to be monitored, and monitoring client software outside the vehicle and monitoring client software of the remote management unit 600 is associated with the driver emotion real-time recognition unit 200, the vehicle-mounted gateway unit 300, and the remote management unit 600 of the vehicle.

The warning prompt unit 400 herein includes a local sound and light warning device or a voice prompt apparatus and a remote monitoring client warning display apparatus. The local sound and light warning device or the voice prompt apparatus in the warning prompt unit 400 is arranged in the cab of the vehicle and outside the vehicle, and is respectively connected with the driver emotion real-time recognition unit 200 and the vehicle-mounted gateway unit 300. The local warning prompt unit provided in this way can send a voice prompt or sound and light warning according to the driver real-time emotional status sent by the driver emotion real-time recognition unit 200 or the vehicle-mounted gateway unit 300.

The remote monitoring client warning display apparatus in the warning prompt unit 400 is arranged on the government industry management client software, enterprise operation management client software, driver and passenger service client software of the remote management unit, and is connected with the vehicle-mounted gateway unit 300. The monitoring client of the warning prompt unit provided in this way sends voice or text prompts according to the driver identity verification result or the driver status monitoring and determination result sent by the vehicle-mounted gateway unit 300.

Figure 4:
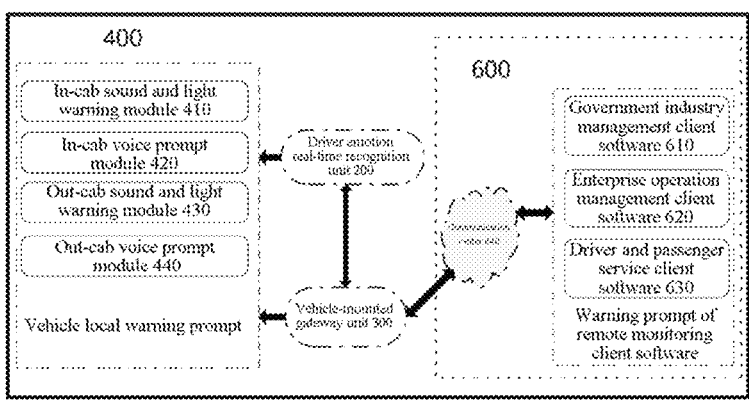
FIG. 4 is a schematic diagram of a composition principle and a usage procedure diagram of a warning prompt unit according to an embodiment of the present invention.

FIG. 4 is a schematic diagram of a composition principle and a usage procedure of the warning prompt unit 400 in the safe driving early warning system given in this embodiment.

As shown in FIG. 4, the warning prompt unit 400 in this embodiment includes vehicle local warning prompt subunits and warning prompt subunits of remote monitoring client software such as government industry management client software 610, enterprise operation management client software 620, and driver and passenger service client software 630 in cooperation with each other, such as an in-cab sound and light warning module 410, an in-cab voice prompt module 420, an out-cab sound and light warning module 430, and an out-cab voice prompt module 440.

As shown in FIG. 1 and FIG. 4, the in-cab sound and light warning module 410 of the warning prompt unit 400 provided in this way is used to issue a sound and light warning when the driver emotion recognition result is abnormal. As an example, the light emitted by the sound and light warning device of the light warning module is generally red by default.

The in-cab voice prompt module 420 is configured to prompt the driver to adjust the emotion or park nearby when the driver emotion recognition result is abnormal. As an example, the in-cab voice prompt module 420 and the sound and light warning module in the cab can be set independently or combined into a voice sound and light warning device.

The out-cab sound and light warning module 430 is configured to issue a sound and light warning to people outside the vehicle if the driver emotion recognition result is seriously abnormal. As an example, the light emitted by the sound and light warning device of the sound and light warning module here is generally red by default, and the volume of the warning sound is enough to alert passers-by in a noisy environment on the road.

The out-cab voice prompt module 440 is configured to issue voice prompts to people outside the vehicle when the driver emotion recognition result is seriously abnormal. As an example, the volume of the voice prompt generated by the out-cab voice prompt module 440 and the volume of the warning sound are enough to cause passers-by to be highly alert in a noisy environment on the road, and the clarity of the voice broadcast of the voice warning content can be clearly understood by the listeners.

The government industry management client software 610 is configured to receive the warning information forwarded by the vehicle-mounted gateway through the communication center when the driver emotion recognition result is abnormal. As an example, when the government industry management client software receives information such as serious abnormalities in the driver emotion recognition result, the government industry management client software starts the emergency management process according to the emergency plan by default.

The enterprise operation management client software 620 is configured to receive the warning information forwarded by the vehicle-mounted gateway through the communication center when the driver emotion recognition result is abnormal. As an example, when the enterprise operation management client software 620 receives information such as serious abnormalities in the driver emotion recognition result, the enterprise operation management client software starts the emergency management process according to the emergency plan by default, and simultaneously sends emergency warning information to the government industry management client.

The driver and passenger service client 630 is configured to receive the warning information forwarded by the vehicle gateway through the communication center when the driver emotion recognition result is abnormal, and send a voice prompt with preset content according to different driver and passenger service client user roles, for example, for prompting the driver to adjust the emotion or park nearby or the like while sending the warning information. As an example, the driver and passenger service client herein sends a voice prompt while sending warning information, and the content of the voice prompt varies according to different driver and passenger service client user roles. For example, the driver service client voice prompts the driver to adjust the emotion or prompts the driver to concentrate or park nearby; and the escort service client voice of a transport vehicles for hazardous chemicals prompts the escort to supervise the driver to adjust the emotion or prompts and supervise the driver to concentrate or park nearby or the like.

As shown in FIG. 1, the vehicle control unit 500 in this system is arranged in the cab of the vehicle 100 to be monitored, and is associated with the driver emotion real-time recognition unit 200, the vehicle-mounted gateway unit 300, and the remote management unit 600 of the vehicle.

The vehicle control unit 500 is arranged in the vehicle cab or the engine compartment of the vehicle, is linked with the starting system, the speed control system, and the braking system of the vehicle, and is associated with the vehicle-mounted gateway unit 300 and the driver emotion real-time recognition unit 200, and is associated with the warning prompt unit 400, the remote management unit 600 and/or the driver emotion real-time recognition unit 200 through the vehicle-mounted gateway unit 300.

The vehicle control unit 500 can control whether the vehicle performs speed limitation, speed reduction, or emergency braking according to the driver real-time emotional status analysis result sent by the driver emotion real-time recognition unit 200 or the vehicle-mounted gateway unit 300.

Figure 5:
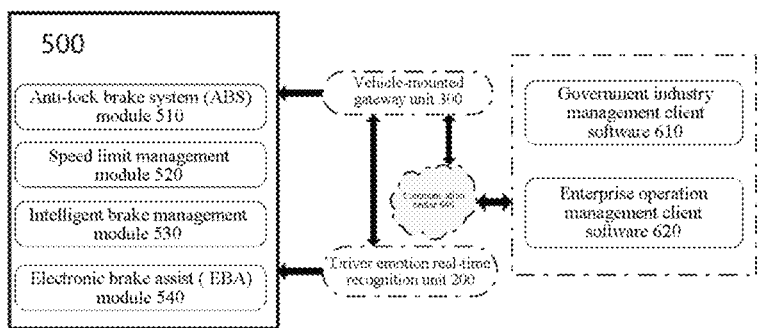
FIG. 5 is a schematic diagram of a composition principle and a usage procedure of a vehicle control unit according to an embodiment of the present invention.

FIG. 5 is a schematic diagram of a composition principle and a usage procedure of a vehicle control unit 500 in a safe driving early warning system in this embodiment.

Based on FIG. 5, the vehicle control unit 500 provided in this embodiment includes an anti-lock brake system (ABS) module 510 and/or a speed limit management module 520 and/or an intelligent brake management module 530 and/or an electronic brake assist (EBA) module 540 in combination or independently.

As shown in FIG. 1 and FIG. 5, the vehicle control unit 500 provided in this way can use the anti-lock brake system (ABS) module 510 to receive the driver real-time emotional abnormality recognition result sent by the driver emotion real-time recognition unit 200, or forwarded by the vehicle-mounted gateway unit 300 for the driver emotion real-time recognition unit 200 or forwarded by the communication center 640 and the vehicle-mounted gateway unit 300 for the enterprise operation management client software 610, and prevent the vehicle from losing control over the driving direction or skidding that may occur during emergency braking.

The vehicle control unit 500 can use the speed limit management module 520 to receive the driver real-time emotional abnormality recognition result sent by the driver emotion real-time recognition unit 200, or forwarded by the vehicle-mounted gateway unit 300 for the driver emotion real-time recognition unit 200 or forwarded by the communication center 640 and the vehicle-mounted gateway unit 300 for the enterprise operation management client software 610, and control the maximum driving speed of the vehicle.

The vehicle control unit 500 can use the intelligent brake management module 530 to receive the driver real-time emotional abnormality recognition result sent by the driver emotion real-time recognition unit 200, or forwarded by the vehicle-mounted gateway unit 300 for the driver emotion real-time recognition unit 200 or forwarded by the communication center 640 and the vehicle-mounted gateway unit 300 for the enterprise operation management client software 610, and start the intelligent braking apparatus to reduce the real-time driving speed of the vehicle.

The vehicle control unit 500 can use the electronic brake assist (EBA) module 540 to receive the driver real-time emotional abnormality recognition result sent by the driver emotion real-time recognition unit 200, or forwarded by the vehicle-mounted gateway unit 300 for the driver emotion real-time recognition unit 200 or forwarded by the communication center 640 and the vehicle-mounted gateway unit 300 for the enterprise operation management client software 610, and quickly start all the braking force when emergency braking is required to prevent traffic accidents at an excessively long brake distance caused by the slow response of the driver under abnormal conditions.

The vehicle control unit 500 is preferably directly associated with the driver emotion real-time recognition unit 200 and the vehicle-mounted gateway unit 300 in deployment application, so that when the vehicle control unit 500 receives a driver emotional status abnormal detection result, the vehicle control unit controls the vehicle to perform speed limitation, speed reduction, or emergency braking; so as to implement different types of precise control over the vehicle in different situations and effectively ensure the driving safety of the vehicle.

As shown in FIG. 1, the remote management unit 600 in this system is set on a cloud platform and/or a local storage server of the relevant government industry authorities of automobile transportation and/or a personal hand-held intelligent terminal of the relevant management personnel, a cloud platform and/or a local storage server of an automobile transportation enterprise and relevant transportation parties and/or a personal hand-held intelligent terminal of the relevant management personnel, and a personal hand-held intelligent terminal of driver and passenger personnel, and is associated with the vehicle-mounted gateway unit 300, and is associated with the driver emotion real-time recognition unit 200, the warning prompt unit 400, and the vehicle control unit 500 through the vehicle-mounted gateway unit 300.

When the remote management unit 600 runs, the remote management unit receives the driver real-time emotion recognition result sent by the vehicle-mounted gateway unit 300, gives vehicle management and driver management control instructions according to the emotion recognition result, feeds back the instructions to the vehicle-mounted gateway unit 300, and feeds back the instructions to the warning prompt unit 400 or the vehicle control unit 500 through the vehicle gateway to issue a sound and light warning or a voice prompt, or control the vehicle ACC to open or close or control the vehicle to perform speed limitation, speed reduction, or emergency braking.

Figure 6:
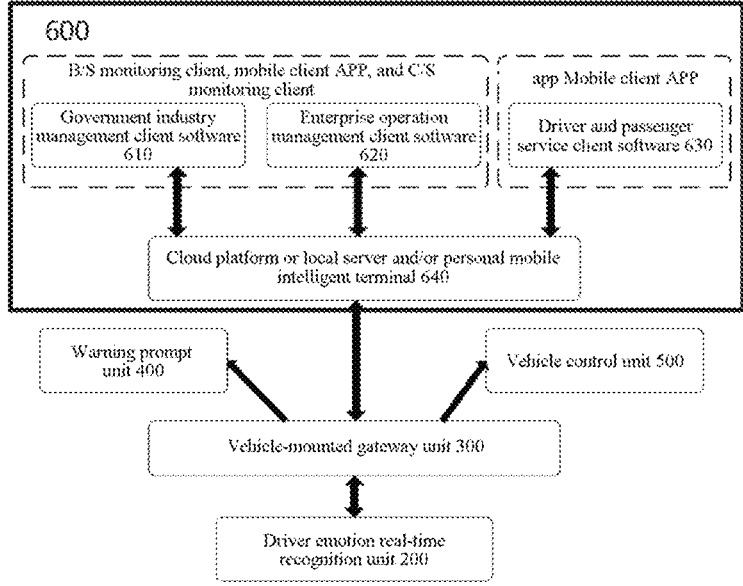
FIG. 6 is a schematic diagram of a composition principle and a usage procedure of a remote management unit according to an embodiment of the present invention.

FIG. 6 is a schematic diagram of a composition principle and a usage procedure of a remote management unit 600 in a safe driving early warning system in this embodiment.

As shown in FIG. 6, the remote management unit 600 in this embodiment includes government industry management client software 610, enterprise operation management client software 620, driver and passenger service client software 630, and a communication center 640 (such as a cloud platform or a local server and/or a personal mobile intelligent terminal) in cooperation with each other.

Figure 7:
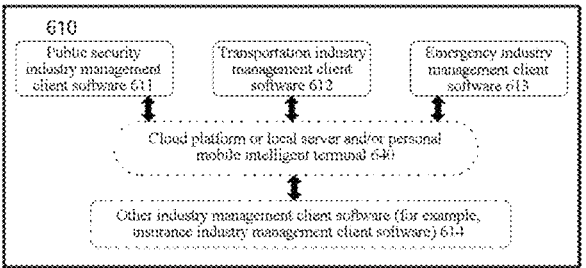
FIG. 7 is a schematic diagram of a composition principle of a government industry management client of a remote management unit according to an embodiment of the present invention.

As shown in FIG. 1 and FIG. 7, the remote management unit 600 provided in this way can use the government industry management client software 610 to receive and display the driver emotion status monitoring result forwarded by the vehicle-mounted gateway unit 300 and the communication center 640 for the driver emotion real-time recognition unit 200, issue relevant management instructions to manage the driver based on the received driver emotional status monitoring result; and when the received driver emotional status monitoring result is seriously abnormal, start the emergency management process and issue relevant emergency response instructions.

The remote management unit 600 can use the enterprise operation management client software 620 to receive and display the driver emotion status monitoring result sent by the driver emotion real-time recognition unit 200 or forwarded by the vehicle-mounted gateway unit 300 and the communication center 640 for the driver emotion real-time recognition unit 200, issue relevant management instructions to manage the driver based on the received driver emotional status monitoring result; and when the received driver emotional status monitoring result is seriously abnormal, start the emergency management process, send an emergency warning to the government industry management client, and issue relevant emergency response instructions.

The remote management unit 600 can use the driver and passenger service client software 630 to receive and display the driver emotional status monitoring result sent by the driver emotion real-time recognition unit 200 or forwarded by the vehicle-mounted gateway unit 300 and the communication center 640 for the driver emotion real-time recognition unit 200, and send a relevant warning prompt according to the received driver emotional status monitoring result.

The remote management unit 600 can use the communication center 640 to communicate with the vehicle-mounted gateway unit 300, and receive and store the current driver facial expression dynamic information or the driver status monitoring result captured by the driver emotion real-time recognition unit 200 and forwarded by the vehicle-mounted gateway unit 300 for the driver emotion real-time recognition unit 200. When an emotion intelligence analysis and recognition component is set in the remote management unit 600, the emotion intelligence analysis and recognition can be performed through the cloud platform or the local server of the communication center 640.

The communication center 640 herein serves as the computer system environment for the government industry management client software 610, the enterprise operation management client software 620, and the driver and passenger service client software 630 at the same time, supports related software applications, and forwards management instructions or response instructions of the government industry management client software 610, the enterprise operation management client software 620, and the driver and passenger service client software 630 to the vehicle-mounted gateway unit 300.

When the safe driving early warning system for intervention based on driver emotions in this embodiment is used in commercial vehicles, the remote management unit 600 generally needs to have the government industry management client 610, the enterprise operation management client 620, the driver and passenger service client 630, and the communication center 640 at the same time. When the safe driving early warning system for intervention based on driver emotions in this embodiment is used in non-commercial transport vehicles, the remote management unit 600 may not have the government industry management client 610. When the safe driving early warning system for intervention based on driver emotions is used in private vehicles, the remote management unit 600 may not have the government industry management client 610 and the enterprise operation management client 620, the driver and passenger service client 630 may only reserve a driver service client 631, and the communication center 640 may only reserve a driver service client 643.

On this basis, the present invention further explicitly provides specific apparatuses that may be involved in the corresponding functional units and modules in the safe driving early warning system for intervention based on driver emotions.

Figure 2:
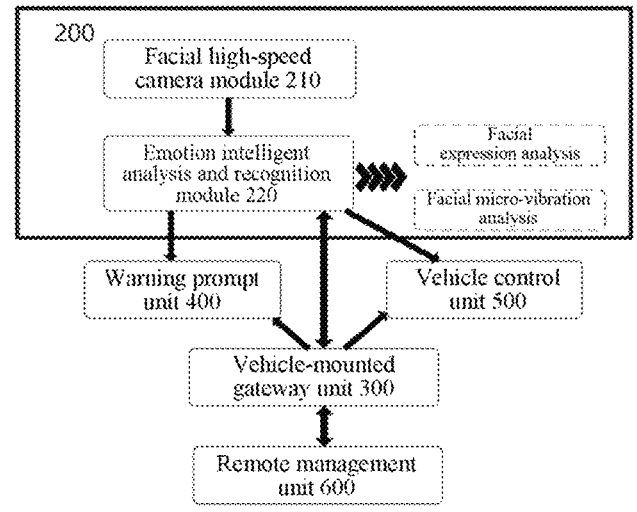
FIG. 2 is a schematic diagram of a composition principle and a usage procedure of a driver emotion real-time recognition unit according to an embodiment of the present invention.

FIG. 2 is a schematic diagram of a composition principle and a usage procedure of a driver emotion real-time recognition unit 200 in a safe driving early warning system in this embodiment.

As shown in FIG. 2, the driver emotion real-time recognition unit 200 in this embodiment mainly includes a facial high-speed camera module 210 and an emotion intelligent analysis and recognition module 220.

the facial high-speed camera module 210 herein is configured to capture the current driver facial expression dynamics. The facial high-speed camera module 210 includes, but is not limited to, an external high-speed video capturing camera, a built-in high-speed video capturing camera, and a supplementary light apparatus. The types of the facial high-speed camera capturing apparatus include but are not limited to a visible light high-speed video capturing camera, a near-infrared high-speed video capturing camera, a special high-speed camera for capturing 3D facial expression dynamics or a 3D high-speed facial expression dynamic capturing instrument; and are determined according to vehicle installation conditions and carrier management requirements, and are not limited herein.

The emotion intelligent analysis and recognition module 220 herein is configured to perform intelligent analysis and recognition on the facial expression dynamics captured by the facial high-speed camera module 210, and determine a current driver real-time emotional status. The apparatus form of the emotion intelligent analysis and recognition module includes but is not limited to an emotion intelligent analysis and recognition component (module) built in the driver emotion real-time recognition unit, an emotion intelligent analysis and recognition component (module) in the vehicle-mounted gateway unit, and an emotion intelligent analysis and recognition component (module) in the remote management unit. Furthermore, the type of the emotion intelligent analysis and recognition apparatus includes but is not limited to facial expression analysis, micro-expression analysis, and facial micro-vibration analysis according to different technical principles. The details are determined according to vehicle installation conditions and carrier management requirements, and are not limited herein.

The driver emotion real-time recognition unit 200 thus configured can be directly associated with the vehicle control unit 500 or indirectly associated with the vehicle control unit 500 and/or the remote management unit 600 through the vehicle-mounted gateway unit 300 when deployed.

When the driver emotion real-time recognition unit 200 is directly associated with the vehicle control unit 500, and the driver real-time emotion recognition result reaches or exceeds a danger threshold, the vehicle control unit 500 controls the speed limitation, speed reduction or emergency braking of the vehicle, and the warning prompt unit issues a dangerous status or dangerous behavior warning prompt, and an analysis and recognition or determination result and an action status of the vehicle control unit are uploaded to the remote management unit 600 through the vehicle-mounted gateway unit 300.

After the driver emotion real-time recognition unit 200 is indirectly associated with the vehicle control unit 500 through the vehicle-mounted gateway unit 300, and the driver real-time emotion recognition result reaches or exceeds a danger threshold, the vehicle-mounted gateway unit 300 sends an instruction to the vehicle control unit 500, the vehicle control unit 500 controls the speed limitation, speed reduction or emergency braking of the vehicle, and the warning prompt unit issues a dangerous status or dangerous behavior warning prompt, and an analysis and recognition or determination result and an action status of the vehicle control unit 500 are uploaded to the remote management unit 600 through the vehicle-mounted gateway unit 300.

When the driver emotion real-time recognition unit 200 is indirectly associated with the vehicle control unit 500 through the vehicle-mounted gateway unit 300, but the emotion intelligent analysis and recognition component based on video analysis is in the remote management unit 600, the current driver facial expression dynamic information captured by the facial high-speed camera module in the driver emotion real-time recognition unit 200 is uploaded to the remote management unit 600 through the vehicle-mounted gateway unit 300, the remote management unit 600 performs intelligent analysis, recognition, or determining and then returns the analysis and recognition or determination result to the vehicle-mounted gateway unit 300, and the vehicle-mounted gateway unit 300 sends instructions to the vehicle control unit 500; the vehicle control unit 500 controls speed limitation, speed reduction, or emergency braking of the vehicle, the warning prompt unit 400 sends a dangerous state or dangerous behavior warning prompt, and the action status of the vehicle control unit 500 is uploaded to the remote management unit through the vehicle-mounted gateway.

FIG. 3 is a schematic diagram of a composition principle of the vehicle-mounted gateway unit 300 and a network communication module thereof in a safe driving early warning system for intervention based on driver emotions according to this embodiment.

Based on FIG. 3, the network communication module 310 in the vehicle-mounted gateway unit 300 in this embodiment includes a 5G communication apparatus 311, a CAN bus communication apparatus 312, a TCP/IP communication apparatus 313, a Bluetooth (Bluetooth) communication apparatus 314, and other wireless communication (Wi-Fi, UWB, Zigbee, etc.) apparatuses 315.

The network communication module 310 can use the 5G communication apparatus 311 to perform communication between the vehicle-mounted gateway unit 300 and the remote management unit 600.

The network communication module 310 can use the CAN bus communication apparatus 312 to implement CAN bus wired communication between the vehicle-mounted gateway unit 300 and the driver emotion real-time recognition unit 200, the warning prompt unit 400 and the vehicle control unit 500.

The network communication module 310 can use the TCP/IP communication apparatus 313 to implement TCP/IP wired communication or wireless communication between the vehicle-mounted gateway unit 300 and the driver emotion real-time recognition unit 200, the warning prompt unit 400, the vehicle control unit 500, and the remote management unit 600.

The network communication module 310 can use the Bluetooth (Bluetooth) communication apparatus 314 to implement wireless communication based on the Bluetooth (Bluetooth) protocol between the vehicle-mounted gateway unit 300 and the driver emotion real-time recognition unit 200 and the warning prompt unit 400.

The network communication module 310 can use other wireless communication (Wi-Fi, UWB, Zigbee, etc.) apparatuses 314 to implement wireless communication based on corresponding protocols such as Wi-Fi, UWB, and Zigbee between the vehicle-mounted gateway unit 300 and the driver emotion real-time recognition unit 200 and the warning prompt unit 400.

As a preferred solution, the network communication module 310 in this embodiment has at least three communication apparatuses such as the 5G communication apparatus 311, the CAN bus communication apparatus 312, and the TCP/IP communication apparatus 313, and configuration of other wireless communication apparatuses is determined according to a specific communication mode of the camera installed on the vehicle, which is not limited herein.

Based on FIG. 3, the data storage module 320 in the vehicle-mounted gateway unit 300 in this embodiment includes a built-in data storage apparatus and an external data storage apparatus.

The built-in data storage apparatus is configured to store the current driver facial expression dynamic information uploaded by the driver emotion real-time recognition unit. The built-in data storage apparatus specifically includes, but is not limited to, a built-in static random access memory SRAM, a built-in dynamic random access memory DRAM, a built-in hard disk, and a built-in read-only memory ROM.

The external data storage apparatus herein includes but is not limited to an external mobile hard disk, a USB flash drive, a TF memory card, an SD memory card, a rewritable CD-RW, a DVD-RAM disc, a non-rewritable CD-ROM, and a DVD-ROM disc.

As shown in FIG. 3, the edge computing module 330 in the vehicle-mounted gateway unit 300 in this embodiment includes an AI intelligent chip with an edge computing function and a terminal SDK with edge computing.

Herein, the circuit board AI intelligent chip with an edge computing function and the terminal SDK with edge computing are configured to perform emotion intelligent analysis, recognition, analysis and determining on the current driver facial expression dynamic information uploaded by the driver emotion real-time recognition unit.

According to this, the vehicle-mounted gateway unit 300 jointly formed by the network communication module 310, the data storage module 320, and the edge computing module 330 can be directly associated with the driver emotion real-time recognition unit 200, the vehicle control unit 500, the warning prompt unit 400 and the remote management unit 500 in specific deployment.

When the vehicle-mounted gateway unit 300 receives the driver real-time abnormal emotion result, the vehicle-mounted gateway unit 300 sends an instruction to the vehicle control unit 500 to control the speed limitation, speed reduction or emergency braking of the vehicle, sends a dangerous status or dangerous behavior warning to the warning prompt unit 400 and uses a voice prompt to prompt the driver to eliminate abnormal emotions or prompt the driver to park and rest nearby, and forwards the driver status monitoring result and action information of the vehicle control unit to the remote management unit 600.

When the emotion intelligent analysis recognition component based on video analysis is in the remote management unit 600, the vehicle-mounted gateway unit 300 forwards the current driver facial expression dynamic information captured by the facial high-speed camera apparatus to the remote management unit 600; receives the analysis and recognition or determination result obtained by the remote management unit 600 after analysis and recognition or determining and sends an instruction to the vehicle control unit 500 and/or the warning prompt unit 400, and then uploads the action status of the vehicle control unit to the remote management unit 600.

Further referring to FIG. 4, the warning prompt unit 400 in this embodiment can be directly associated with the driver emotion real-time recognition unit 200 and the vehicle-mounted gateway unit 300 during specific deployment.

When the driver emotion recognition result received by the vehicle local warning prompt subunit and sent by the driver emotion real-time recognition unit 200 or sent by the driver emotion real-time recognition unit 200 through the vehicle-mounted gateway unit 300 is abnormal, the warning prompt unit 400 sends a sound and light warning and voice prompts the driver to adjust emotions, concentrate, or park nearby.

When the driver emotion recognition result received by the vehicle local warning prompt subunit and sent by the driver emotion real-time recognition unit 200 or sent by the driver emotion real-time recognition unit 200 through the vehicle-mounted gateway unit 300 is seriously abnormal, the warning prompt unit 400 sends a sound and light warning inside and outside the vehicle and voice prompts the driver inside and outside the vehicle to adjust emotions, concentrate, or park nearby, and prompts passers-by to be alert to abnormal vehicles, avoid them in time or call the police immediately.

When the driver emotion recognition result received by the remote monitoring client software warning prompt subunit and sent by the driver emotion real-time recognition unit 200 through the vehicle-mounted gateway unit 300 and the communication center is abnormal, the warning prompt unit 400 sends a warning prompt or sends a voice prompt.

When the driver emotion recognition result received by the remote monitoring client software warning prompt subunit and sent by the driver emotion real-time recognition unit 200 through the vehicle-mounted gateway unit 300 and the communication center is seriously abnormal, the warning prompt unit 400 sends an emergency warning and a voice prompt and starts the emergency management process according to the emergency plan by default.

FIG. 7 is a schematic diagram of a composition principle of the government industry management client 610 of the remote management unit in a safe driving early warning system in this embodiment.

Based on FIG. 7, the government industry management client 610 of the remote management unit 600 in this embodiment includes public security industry management client software 611, transportation industry management client software 612, emergency industry management client software 613, and other industry management client software 614 (for example, insurance industry management client software) according to different industry departments.

The public security industry management client software 611 in the government industry management client 610 is used for the driver abnormal emotion warning. The driver abnormal emotion warning can receive and display the driver abnormal emotion warning information, and when receiving a high-risk warning, can send warning information to the enterprise operation management client and the driver and passenger service client in the form of text, image, voice, file, or the like and send linkage management information according to the setting of the emergency plan.

The transportation industry management client software 612 in the government industry management client 610 is used for the driver abnormal emotion warning. The driver abnormal emotion warning can receive and display the driver abnormal emotion warning information, and when receiving a high-risk warning, can send warning information to the enterprise operation management client and the driver and passenger service client in the form of text, image, voice, file, or the like and send linkage management information according to the setting of the emergency plan.

The emergency industry management client software 613 in the government industry management client 610 is used for the driver abnormal emotion warning. The driver abnormal emotion warning can receive and display the driver abnormal emotion warning information, and when receiving a high-risk warning, can send warning information to the enterprise operation management client and the driver and passenger service client in the form of text, image, voice, file, or the like and send linkage management information according to the setting of the emergency plan.

Other industry management client software (such as insurance industry management client software) 614 in the government industry management client 610 is configured to query the driver abnormal emotion warning record. The driver abnormal emotion warning record query supports querying the driver abnormal emotion warning record information of a vehicle through a driver name, a vehicle license plate number, and a specified time range.

Other industry management client software also supports function customization according to corresponding industry management needs, or independently chooses to enable or disable related monitoring client functions within the scope of user authority, which is not limited herein.

Figure 8:
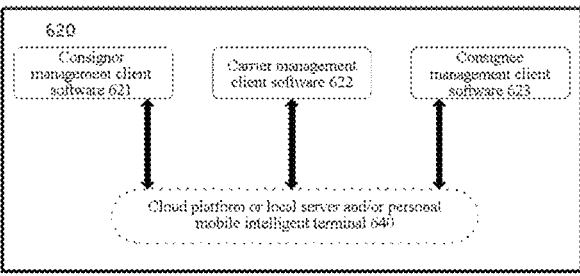
FIG. 8 is a schematic diagram of a composition principle of an enterprise operation management client of a remote management unit according to an embodiment of the present invention.

FIG. 8 is a schematic diagram of a composition principle of the enterprise operation management client 620 of the remote management unit in a safe driving early warning system in this embodiment.

Based on FIG. 8, the enterprise operation management client 620 of the remote management unit 600 in this embodiment includes consignor management client software 621, carrier management client software 622, and consignee management client software 623 according to different users.

The consignor management client software 621 in the enterprise operation management client 620 is configured to query the driver abnormal emotion warning record. As an example, the driver abnormal emotion warning record query supports querying the driver abnormal emotion warning record information of a vehicle through a driver name, a vehicle license plate number, and a specified time range.

The carrier unit management client software 622 in the enterprise operation management client 620 is configured to alert the driver of abnormal emotions.

As an example, the driver abnormal emotion warning can receive and display the driver abnormal emotion warning information, and when receiving the warning, sends warning information to the driver and passenger service client in the form of text, image, voice, file, or the like, and when receiving a high-risk warning, sends warning information to the driver and passenger service client in the form of text, image, voice, file, or the like, and immediately synchronously sends linkage warning information to the government industry management client according to setting of the emergency plan.

The consignee management client software 623 in the enterprise operation management client 620 is configured to query the driver abnormal emotion warning record. As an example, the driver abnormal emotion warning record query supports querying the driver abnormal emotion warning record information of a vehicle through a driver name, a vehicle license plate number, and a specified time range.

When the safe driving early warning system for intervention based on driver emotions in this embodiment is used for commercial vehicles of cargo transportation, the enterprise operation management client 620 of the remote management unit 600 usually has the consignor management client software 621, the carrier management client software 622, and the consignee management client software 623. When the safe driving early warning system for intervention based on driver emotions in this embodiment is used for commercial vehicles of passenger transportation, non-commercial official vehicles, and non-commercial transport vehicles, the enterprise operation management client 620 of the remote management unit 600 can only reserve the carrier management client software 622. When the safe driving early warning system for intervention based on driver emotions in this embodiment is used for private vehicles, the remote management unit 600 may not have the enterprise operation management client 620.

Figure 9:
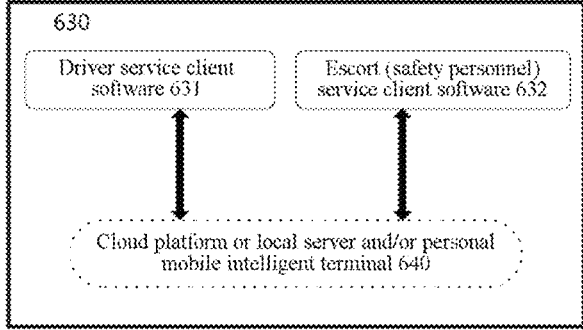
FIG. 9 is a schematic diagram of a composition principle of a driver and passenger service client of a remote management unit according to an embodiment of the present invention.

FIG. 9 is a schematic diagram of a composition principle of the driver and passenger service client 630 of the remote management unit in a safe driving early warning system in this embodiment.

Based on FIG. 9, the driver and passenger service management client 630 of the remote management unit 600 in this embodiment includes driver service client software 631 and escort service client software 632 according to different users.

The driver and passenger service client software 631 in the driver and passenger service client 630 is configured to alert the driver of abnormal emotions.

As an example, the driver abnormal mood warning unit can receive and display the driver abnormal mood warning information, when receiving a medium-risk or low-risk level warning, send warning information through voice or specific preset sound, and when receiving a high-risk warning send warning information in the form of high-level warning content setting voice or specific high-level warning preset sound.

The escort service client software 632 in the driver and passenger service client 630 is configured to alert the driver of abnormal emotions.

As an example, the driver abnormal mood warning unit can receive and display the driver abnormal mood warning information, when receiving a medium-risk or low-risk level warning, send warning information through voice or specific preset sound, and when receiving a high-risk warning sent by the government industry management client and the carrier management client, send warning information in the form of high-level warning content setting voice or specific high-level warning preset sound, to continuously voice prompt the escort to supervise the driver to correct the abnormal behavior or park and rest when appropriate, and support feedback of a correction status and a corrective measure in the form of text, image, voice, file, or the like within a specified time.

When the safe driving early warning system based on the driver emotional intervention in this embodiment is used for commercial vehicles of dangerous goods transportation, the escort (safety personnel) service client software 632 in the driver and passenger service client 630 of the remote management unit 600 is usually the escort service client software. When the safe driving early warning system for intervention based on driver emotions in this embodiment is used for passenger transport vehicles or school buses, the escort (safety officer) service client software 632 in the driver and passenger service client 630 of the remote management unit 600 is usually the safety personnel service client software. When the safe driving early warning system for intervention based on driver emotions in this embodiment is used for passenger and cargo transport vehicles or private vehicles that do not require escorts, safety personnel or co-drivers, the driver and passenger service client 630 of the remote management unit 600 may not have escort (safety personnel) service client software.

Figure 10:
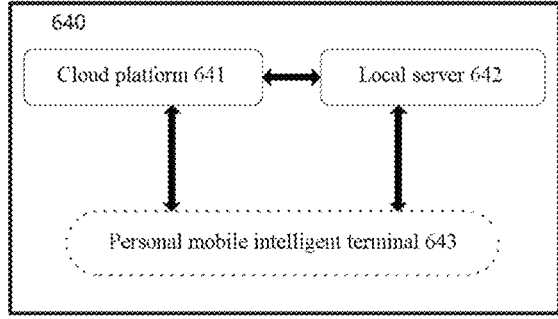
FIG. 10 is a schematic diagram of a composition principle of a communication center of a remote management unit according to an embodiment of the present invention.

FIG. 10 is a schematic diagram of a composition principle of the communication center 640 in the remote management unit in a safe driving early warning system for intervention based on driver emotions in this embodiment.

Based on FIG. 10, the communication center 640 of the remote management unit 600 provided in this embodiment includes a cloud platform 641, a local server 642, and a personal mobile intelligent terminal 643.

In this embodiment, preferably, a communication center application mode in which a cloud platform is combined with a personal mobile intelligent terminal is used, and can be determined according to the actual communication conditions of different users, and is not limited herein.

The cloud platform 641 in this communication center 640 is configured to store data information uploaded by the driver emotion real-time recognition unit 200, perform intelligent analysis, recognition, and determining of the data information uploaded by the driver emotion real-time recognition unit 200, receive data from the government industry management client software 610/enterprise operation management client software 620/driver and passenger service client software 630 and call a shared data resource pool, support computer hardware platform environments applied in the government industry management client software 610/enterprise operation management client software 620/driver and passenger service client software 630, and perform communication interaction between the government industry management client software 610/enterprise operation management client software 620/driver and passenger service client software 630 and the vehicle-mounted gateway unit 300.

The cloud platform 641 communicates with the vehicle-mounted gateway unit 300, receives and stores the current driver facial expression dynamic information or the driver emotion recognition result captured by the facial high-speed camera module 211 in the driver emotion real-time recognition unit 200 and forwarded by the driver emotion real-time recognition unit 200 through the vehicle-mounted gateway unit 300.

When the emotion intelligent analysis and recognition component is set on the cloud platform 641, the emotion intelligent analysis and recognition is performed by the cloud platform 641, and management instructions or response instructions of the government industry management client software 610, the enterprise operation management client software 620, and the driver and passenger service client software 630 are forwarded to the vehicle-mounted gateway unit 300.

The cloud platform 641 supports B/S monitoring client applications, and the B/S monitoring client is developed based on the latest version of China's high-security operating system and China's high-security Xinchuang browser.

The local server 642 in this communication center 640 is configured to store data information uploaded by the driver emotion real-time recognition unit 200, perform intelligent analysis, recognition, and determining of the data information uploaded by the driver emotion real-time recognition unit 200, receive data from the government industry management client software 610/enterprise operation management client software 620/driver and passenger service client software 630 and call a data source, support computer hardware platform environments applied in the government industry management client software 610/enterprise operation management client software 620/driver and passenger service client software 630, and perform communication interaction between the government industry management client software 610/enterprise operation management client software 620/driver and passenger service client software 630 and the vehicle-mounted gateway unit 300.

The local server 642 communicates with the vehicle-mounted gateway unit 300, receives and stores the current driver facial expression dynamic information or the driver emotion recognition result captured by the facial high-speed camera module 211 in the driver emotion real-time recognition unit 200 and forwarded by the driver emotion real-time recognition unit 200 through the vehicle-mounted gateway unit 300.

When the emotion intelligent analysis and recognition component is set on the local server 642, the emotion intelligent analysis and recognition is performed by the local server 642, and management instructions or response instructions of the government industry management client software 610, the enterprise operation management client software 620, and the driver and passenger service client software 630 are forwarded to the vehicle-mounted gateway unit 300.

The local server 642 supports the C/S monitoring client application, and the C/S monitoring client is developed based on various latest-version high-security operating systems of the Linux kernel.

The personal hand-held intelligent terminal 643 in this communication center 640 is used for the online query tool and temporary storage space of the data information uploaded by the driver emotion real-time recognition unit 200, supports computer hardware environments applied in the government industry management mobile client APP software 610/enterprise operation management mobile client APP software 620/driver and passenger service mobile client APP software 630, and performs the communication interaction between the government industry management mobile client APP software 610/enterprise operation management mobile client APP software 620/driver and passenger service mobile client APP software 630 and the cloud platform 641 or the local server 642 and the vehicle-mounted gateway unit 300.

The personal hand-held intelligent terminal 643 communicates with the vehicle-mounted gateway unit 300 through the cloud platform 641 or the local server 642, receives the driver abnormal emotion warning information forwarded by the vehicle-mounted gateway unit 300 for the driver emotion real-time recognition unit 200 and forwarded by the cloud platform 641 or the local server 642, and forwards the management instruction or response instruction of the government industry management mobile client APP software 610/enterprise operation management mobile client APP software 620/driver and passenger service mobile client APP software 630 to the vehicle-mounted gateway unit 300.

The personal handheld intelligent terminal 643 supports the mobile monitoring client APP application, and the mobile monitoring client APP is developed based on an operating system such as HarmonyOS micro-kernel or Android based on the Linux kernel.

In this way, the remote management unit 600 including the government industry management client software 610, the enterprise operation management client software 620, the driver and passenger service client software 630 and the communication center 640 is set on a cloud platform and/or a local storage server of the relevant government industry authorities of automobile transportation and/or a personal hand-held intelligent terminal of the relevant management personnel, a cloud platform and/or a local storage server of an automobile transportation enterprise and relevant transportation parties and/or a personal hand-held intelligent terminal of the relevant management personnel, and a personal hand-held intelligent terminal of driver and passenger personnel, and is connected with the vehicle-mounted gateway unit.

In this way, the remote management unit 600 receives the driver emotion recognition result sent by the vehicle-mounted gateway unit 300 and gives vehicle management and driver management control instructions, or receives driver facial expression dynamic capturing information sent by the vehicle-mounted gateway unit 300, recognizes and analyzes driver real-time emotions, gives vehicle management and driver management control instructions based on an emotion recognition result, feeds back the instructions to the vehicle-mounted gateway unit 300, feeds back the instructions to the warning prompt unit 400 or the vehicle control unit 500 through the vehicle-mounted gateway unit 300, and sends a sound and light warning or a voice prompt or controls vehicle speed limitation, speed reduction or emergency braking.

In the safe driving early warning system for intervention based on driver emotions formed in this way, the driver real-time emotion recognition unit captures the driver real-time facial expression dynamic information, and the emotion intelligent analysis and identification module of the driver real-time emotional recognition unit or the edge computing module of the vehicle-mounted gateway unit or the emotion intelligent analysis and recognition module of the remote management unit performs facial micro-expression analysis and/or facial micro-vibration analysis. The analysis result is sent to the vehicle control unit and the warning prompt unit to perform automatic speed control, braking and other operations. While controlling the driving status of the vehicle, a voice prompt or a sound and light warning is sent to prevent the driver from driving the vehicle in an abnormal emotional status that is not suitable for driving, and the driving risk is reduced through active intelligent safety prevention and control when the driver has abnormal emotions, so as to ensure the automobile driving safety.

In addition, when the safe driving early warning system for intervention based on driver emotions is applied to ordinary private vehicles, the remote management unit may not be included.

Finally, it should be noted that the method of the present invention, or specific system units, or some units thereof can be deployed on physical media through program code, such as hard disks, optical discs, or any electronic devices (such as smartphones and computer-readable storage mediums), and when the machine loads and executes the program code (such as a smartphone loads and executes the program code), the machine becomes an apparatus for implementing the present invention. The above method and apparatus of the present invention can also be transmitted in the form of program code through some transmission media, such as cables, optical fibers, or any transmission mode. When the program code is received, loaded and executed by a machine (such as a smartphone), the machine becomes an apparatus for implementing the present invention.

The basic principles, main features, and advantages of the present invention have been shown and described above. Those skilled in the industry should understand that the present invention is not limited by the above-mentioned embodiments. Descriptions in the above-mentioned embodiments and the specification only illustrate the principle of the present invention. The present invention also has various variations and improvements without departing from the spirit and scope of the present invention, which shall fall within the scope claimed in the present invention. The protection scope claimed by the present invention is defined by the appended claims and their equivalents.

What is claimed is:

1. A safe driving early warning system for intervention based on driver emotions, comprising:

a driver emotion real-time recognition unit, configured to obtain current driver facial expression dynamics, and perform intelligent emotional analysis based on the obtained facial expression dynamics or transmit the obtained facial expression dynamics to a vehicle-mounted gateway unit for intelligent emotional analysis; wherein the driver emotion real-time recognition unit can be directly associated with a vehicle control unit according to a real-time emotion recognition result or can be associated with the vehicle control unit through the vehicle-mounted gateway unit, to control a vehicle running status;

the vehicle-mounted gateway unit, respectively associated with the driver emotion real-time recognition unit, the vehicle control unit, a warning prompt unit, and a remote management unit; wherein the vehicle-mounted gateway unit can further cooperate with the driver emotion real-time recognition unit to perform emotion recognition;

the vehicle control unit, linked to a speed control system and a braking system of the vehicle and associated with the vehicle-mounted gateway unit and the driver emotion real-time recognition unit, wherein the vehicle control unit controls the vehicle driving status according to a driver real-time emotional status analysis result sent by the driver emotion real-time recognition unit or the vehicle-mounted gateway unit;

the warning prompt unit, respectively connected and cooperating with the driver emotion real-time recognition unit and the vehicle-mounted gateway unit; and the remote management unit, wherein the remote management unit cooperates with the driver emotion real-time recognition unit to complete driver emotion recognition through the vehicle control unit, and can give corresponding vehicle management and driver management control instructions and feed back the instructions to the vehicle-mounted gateway unit, wherein the driver emotion real-time recognition unit comprises a facial high-speed camera module and an emotion intelligent analysis and recognition module;

the facial high-speed camera module is configured to capture the current driver facial expression dynamics; and the emotion intelligent analysis and recognition module is configured to perform intelligent analysis and recognition on the facial expression dynamics captured by the facial high-speed camera module, and determine a current driver real-time emotional status;

wherein the driver emotion real-time recognition unit is directly associated with the vehicle control unit or indirectly associated with the vehicle control unit and/or the remote management unit through a vehicle-mounted gateway.

2. The safe driving early warning system according to claim 1, wherein the vehicle-mounted gateway unit comprises a network communication module and/or a data storage module and/or an edge computing module;

the network communication module comprises one or more of a 5G communication apparatus, a CAN bus communication apparatus, a TCP/IP communication apparatus, a Bluetooth communication apparatus, and other wireless communication apparatuses, and is configured to perform data exchange between the driver emotion real-time recognition unit, the warning prompt unit, the vehicle control unit, and the remote management unit;

the data storage module comprises a built-in data storage apparatus and an external data storage apparatus, and is configured to store data exchanged between the driver emotion real-time recognition unit, the warning prompt unit, the vehicle control unit, and the remote management unit; and the edge computing module comprises an AI intelligent chip with an edge computing function and a terminal SDK with edge computing, and is configured to perform emotion intelligent analysis and recognition based on the data exchanged between the driver emotion real-time recognition unit, the warning prompt unit, the vehicle control unit, and the remote management unit.

3. The safe driving early warning system according to claim 1, wherein the warning prompt unit comprises a vehicle local warning prompt subunit and a remote monitoring client software warning prompt subunit.

4. The safe driving early warning system according to claim 1, wherein the vehicle control unit comprises an anti-lock brake module and/or a speed limit management module and/or an intelligent brake management module and/or an electronic brake assist module;

the anti-lock brake module is configured to avoid, when an abnormal driver status monitoring result is received, losing control over a vehicle driving direction or skidding that is possible during emergency braking;

the speed limit management module is configured to control a vehicle maximum driving speed when receiving the abnormal driver status monitoring result;

the intelligent brake management module is configured to start the intelligent brake apparatus to reduce a vehicle real-time driving speed when receiving the abnormal driver status monitoring result; and the electronic brake assist module is configured to rapidly start a full braking force if emergency braking is required when the abnormal driver status monitoring result is received.

5. The safe driving early warning system according to claim 4, wherein the vehicle control unit is directly associated with the driver emotion real-time recognition unit and the vehicle-mounted gateway unit; and when the vehicle control unit receives an abnormal driver emotion recognition result, the vehicle control unit controls vehicle speed limitation, speed reduction, or emergency braking.

6. The safe driving early warning system according to claim 1, wherein the vehicle control unit is directly associated with the driver emotion real-time recognition unit and the vehicle-mounted gateway unit; and when the vehicle control unit receives an abnormal driver emotion recognition result, the vehicle control unit controls vehicle speed limitation, speed reduction, or emergency braking.

7. The safe driving early warning system according to claim 1, further comprising the remote management unit, wherein the remote management unit cooperates with the driver emotion real-time recognition unit to complete driver emotion recognition through the vehicle control unit, and can give corresponding vehicle management and driver management control instructions and feed back the instructions to the vehicle-mounted gateway unit.

8. The safe driving early warning system according to claim 7, wherein the remote management unit comprises a government industry management client, an enterprise operation management client, a driver and passenger service client, and a communication center;

the government industry management client of the remote management unit comprises public security industry management client software, transportation industry management client software, emergency industry management client software, and other industry management client software according to different industry departments;

the enterprise operation management client of the remote management unit comprises consignor management client software, carrier management client software, and consignee management client software according to different users;

the driver and passenger service management client of the remote management unit comprises driver service client software and escort service client software according to different users; and the communication center of the remote management unit comprises a cloud platform, a local server, and a personal mobile intelligent terminal.

9. The safe driving early warning system according to claim 8, wherein the remote management unit receives the driver real-time emotion recognition result sent by the vehicle-mounted gateway unit and gives vehicle management and driver management control instructions, or receives driver real-time facial expression capturing information sent by the vehicle-mounted gateway unit, recognizes driver real-time emotions, gives vehicle management and driver management control instructions based on an emotion recognition result, feeds back the instructions to the vehicle-mounted gateway unit, and feeds back the instructions to the warning prompt unit or the vehicle control unit through the vehicle-mounted gateway unit.

10. The safe driving early warning system according to claim 7, wherein the remote management unit receives the driver real-time emotion recognition result sent by the vehicle-mounted gateway unit and gives vehicle management and driver management control instructions, or receives driver real-time facial expression capturing information sent by the vehicle-mounted gateway unit, recognizes driver real-time emotions, gives vehicle management and driver management control instructions based on an emotion recognition result, feeds back the instructions to the vehicle-mounted gateway unit, and feeds back the instructions to the warning prompt unit or the vehicle control unit through the vehicle-mounted gateway unit.

\* \* \* \* \*